United States Patent [19]

Disteldorf et al.

[11] Patent Number: 4,500,697
[45] Date of Patent: Feb. 19, 1985

[54] MIXTURE OF SUBSTANCES SUITABLE FOR USE AS A POWDER VARNISH OR BINDER FOR POWDER VARNISHES

[75] Inventors: Josef Disteldorf, Herne; Rainer Gras, Bochum, both of Fed. Rep. of Germany

[73] Assignee: Chemische Werke Huls Aktiengesellschaft, Marl, Fed. Rep. of Germany

[21] Appl. No.: 622,180

[22] Filed: Jun. 19, 1984

[30] Foreign Application Priority Data

Jun. 24, 1983 [DE] Fed. Rep. of Germany ....... 3322718

[51] Int. Cl.$^3$ .............................................. C08G 18/80
[52] U.S. Cl. ................................................... 528/45
[58] Field of Search .......................................... 528/45

[56] References Cited

U.S. PATENT DOCUMENTS 4,354,014 10/1982 Wolf et al. ............................ 528/45
4,383,076 5/1983 Wolf et al. ............................ 528/45

Primary Examiner—Maurice J. Welsh
Attorney, Agent, or Firm—Oblon, Fisher, Spivak, McClelland & Maier

[57] ABSTRACT

A mixture of substances suitable as a powder varnish or a binder for powder varnishes containing an isocyanate component with partially or totally blocked isocyanate groups, and a polyhydroxyl component, wherein mixed trimers or mixtures of individual trimers are used as the isocyanate component from a mixture of 2-methyl-1,5-diisocyanato-pentane (MPDI) and 2-ethyl-1,4-diisocyanatobutane (EBDI) in the amounts of 88 to 99% by weight of (MPDI) and about 12 to 1% by weight of (EBDI), in combination with 3-isocyanato-3,5,5-trimethylcyclohexylioscyanate (IPDI) or mixed urethane adducts obtained from the reaction of the (MPDI/EBDI) mixture in combination with (IPDI) with diols, triols or a mixture thereof.

12 Claims, No Drawings

MIXTURE OF SUBSTANCES SUITABLE FOR USE AS A POWDER VARNISH OR BINDER FOR POWDER VARNISHES

BACKGROUND OF THE INVENTION

1. Field of the Invention:

This invention relates to new varnish polyisocyanates having an isocyanurate or urethane structure blocked with blocking agents from a mixture of 2-methyl-1,5-diisocyanatopentane or 2-ethyl-1,4-diisocyanatobutane or 3-isocyanatomethyl-3,5,5-trimethylcyclohexylisocyanate or a mixture thereof, and a process for the production of these new varnish polyisocyanates as well as a process for the use thereof as an isocyanate component for the production of thermosetting polyurethane powder varnishes.

2. Description of the Prior Art:

Polyurethane powder varnishes on the basis of partially or completely blocked polyisocyanates or polymers containing hydroxyl groups whose softening point is above 40° are state-of-the-art and are frequently described in the literature, e.g., in the DE-OSS 21 05 777, 25 42 191, 27 35 497, 28 42 641, 30 04 876, 30 39 824, or 31 28 743.

Polyurethane powder varnishes essentially consist of a component containing hydroxyl groups and a polyisocyanate whose NCO groups are partially or completely blocked with a blocking agent, so that the OH:NCO polyaddition reaction cannot take place at temperatures below 140° C. Only after heating to temperatures ≧150° C. is it possible to cross-link such powder varnishes to a coating film within a relevant time while setting free the blocking agent and reacting the OH groups with the NCO groups.

Not all polyisocyanates are suitable for such purposes and in view of the application as powder materials, there are quite a number of restrictions, especially if the polyisocyanates, partially or completely blocked with the usual blocking agents, themselves have characteristics that make grindability more difficult, so that their use in powder varnishes is greatly limited if not impossible, even though their varnish technical as well as chemical and physical characteristics may be very good.

Thus, normally the isocyanato-isocyanurates, such as for example hexamethylenediisocyanate (short: HDI), are liquid as are their reaction products with blocking agents, as described in EP 0 047 452, corresponding to DE-OS 30 33 860, from page 2, line 29 to page 3, line 6, and cannot be used in powder varnishes. An exception is the isocyanato-isocyanurate of 3-isocyanatomethyl-3,5,5-trimethylcyclohexyl isocyanate, also called isophoronediisocyanate, short IPDI. It is solid and has a melting range of 102°–104° C. As is further shown in EP 0 047 452, products can be produced by mixed trimerization of these two polyisocyanates (HDI/IPDI), which in their blocked form, cf. page 8, lines 16-21, are suitable for the production of polyurethane powder varnishes even though this has not been proved by experiments. It is therefore possible to vary the melting points by means of the mole ratio of the diisocyanates. Moreover, among other things the improved solvent compatibility and flexibility at low temperatures are pointed out, cf. page 3, lines 19-21.

Furthermore, in practice the thermal and oxidative stability are of decisive importance, so that thermosetting polyurethane baking enamels do not show any yellowing phenomena at temperatures below those required for hardening the coating films. since otherwise, in case of technical trouble (e.g., assembly-line stoppage), during the thermosetting process more or less large quality reductions (discolorations) must be expected. In the past, this has not always been guaranteed.

Therefore, a need clearly continues to exist for polyisocyanates which, although partially or totally blocked, are suitable for use as cross-linking agents in polyurethane powder varnishes and which are susceptible to grinding. It is further required that these polyisocyanates be thermally and oxidatively stable and not contribute to yellowing of the thermosetting polyurethane baking enamels.

SUMMARY OF THE INVENTION

Accordingly, it is an object of the present invention to provide polyisocyanates which, although partially or totally blocked, are suitable for use as cross-linking agents in polyurethane powder varnishes and which are susceptible to grinding.

It is also an object of this invention to provide polyisocyanates which, although partially or totally blocked, are thermally and oxidatively stable when used in thermosetting polyurethane baking enamels and do not exhibit yellowing at temperatures below those required for hardening the coating films.

Further, it is a particular object of the present invention to provide a mixture of substances which are suitable as a powder varnish or a binder for powder varnishes, which do not exhibit yellowing at temperatures below those required for hardening the coating films.

According to the present invention, the foregoing and other objects are attained by providing a mixture of substances suitable as a powder varnish or a binder for powder varnishes containing an isocyanate component having partially or totally blocked isocyanate groups, and a polyhydroxyl component, wherein the isocyanate component contains trimers or a mixture of trimers from a mixture containing 2-methyl-1,5-diisocyanatopentane (MPDI) and 2-ethyl-1,4-diisocyanatobutane (EBDI) according to the formulas (I) and (II)

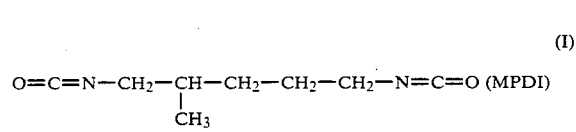

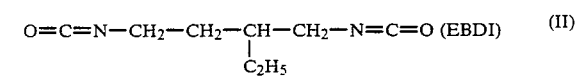

and having about 88 to 99% by weight of (I) and about 12 to 1% by weight of (II) in combination with 3-isocyanatomethyl-3,5,5-trimethylcyclohexylisocyanate (IPDI), isocyanato-isocyanurate trimers or mixtures thereof, mixed urethane adducts or a mixture of the urethane adducts obtained from the reaction of the mixtures of (I) and (II) and (IPDI) with diols and triols.

DETAILED DESCRIPTION OF THE PREFERRED EMBODIMENTS

According to the present invention, it has now been surprisingly found that it is possible to attain polyisocyanates which, although partially or totally blocked, are suitable for use as cross-linking agents in polyurethane powder varnishes. The mixture of the present invention consists mainly of 2-methyl-1,5-diisocyanatopentane (MPDI) and 2-ethyl-1,4-diisocyanatobutane (EBDI), in the amounts of about 88 to 99% by weight of 2-methyl-1,5-diisocyanatopentane and about 12 to 1% by weight of 2-ethyl-1,4-diisocyanatobutane, combined with 3-isocyanatomethyl-3,5,5-trimethylcyclohexylisocyanate, isocyanatoisocyanurate trimers or mixtures thereof, mixed urethane adducts or a mixture of the urethane adducts obtained from the reaction of the mixture of (I) and (II) and (IPDI) with diols and triols, especially trimethylolpropane (TMP) and with blocking agents, particularly ε-caprolactam or 1H-1,2,4-triazole-blocked varnish polyisocyanates, which are used especially as cross-linking agents in polyurethane powder varnishes because of their brittle, grindable form.

The ratio of diisocyanates used for trimerization or urethane adduct formation, MPDI/EBDI mixture to IPDI, is between about 90 to 10 or 10 and 90% by weight, respectively, preferably between about 75 and 25 or 25 and 75% by weight, respectively.

The cross-linking agents according to the invention have a latent NCO content of about 7–18% by weight, preferably about 9–15% by weight and a free NCO content of $\leq 3\%$ by weight, preferably $\leq 2\%$ by weight.

The principle components of the mixture according to the present invention are:
 a. an isocyanate component with partially or completely blocked isocyanate groups,
 b. a polyhydroxyl component and
 c. optionally, conventional adjuvants and additives,
wherein the mixed trimers or mixtures of the individual trimers from a mixture consisting predominantly of 2-methyl-1,5-diisocyanatopentane (MPDI) and 2-ethyl-1,4-diisocyanatobutane (EBDI) of formulas I and II below

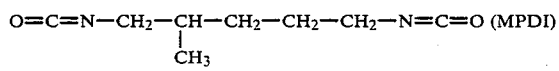

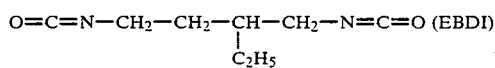

have the following composition:
 88–99% by weight of 2-methyl-1,5-diisocyanatopentane
 12–1% by weight of 2-ethyl-1,4-diisocyanatobutane,
and are applied in combination with 3-isocyanatomethyl-3,5,5-trimethylcyclohexylisocyanate (IPDI) or mixed urethane adducts or a mixture of the individual urethane adducts from the reaction of the MPDI/EBDI mixture in combination with IPDI with diols and/or triols.

The polymers containing hydroxyl groups are epoxy resins, acrylates and especially polyesters, the basis of which are predominantly aromatic dicarboxylic acids, diols and triols in polyurethane powder varnishes.

A particular object of the present invention is the use of the mixture of substances as powder varnishes or as binders for powder varnishes for the coating of any thermosetting substrates according to coating methods known in the art which are suitable for the processing of powder varnishes.

The blocked polyisocyanates according to the invention and the polymers containing hydroxyl groups optionally are formulated by means of conventional technologies into sprayable powders while adding the admixtures customary in PUR chemistry, applied by electrostatic coating and baked at between about 140° and 250° C., preferably between about 160° and 200° C.

The mixing ratio can vary widely. The best varnish technical characteristics are maintained if the binder ratio consists of about 9–45% by weight of cross-linking agents and about 55–91% by weight of polyesters, whereby the OH/NCO ratio can be set at about 1:0.8 to 1:1.2, preferably about 1:0.95 to 1:1.1. It is particularly recommended to use an equivalent NCO of the cross-linking agent per OH equivalent of the polyhydroxyl compound.

The trimers from the mixture consisting of MPDI/EBDI and IPDI in said ratios were produced in the known manner according to the instructions of GB-PS 1 391 066, DE-OSS 23 25 826, 26 44 684 or 29 16 201. The products of the process consist of isocyanato-isocyanurate with optionally higher oligomers and have an NCO content of 14–22% by weight, preferably 15–20.5% by weight, which is reduced to an NCO content of $\leq 3\%$ by weight, preferably $\leq 2\%$ by weight, by blocking with blocking agents known in the art, especially ε-caprolactam or 1H-1,2,4-triazole.

Trimerization can take place in substance (neat) or in an inert organic solvent. The catalytic reaction should be stopped as soon as the NCO content of the mixture indicates that about 30–50% of the NCO groups are reacted. The diisocyanate that has not been reacted is subsequently separated together with the catalyst and optionally with the solvent.

The products of the process can also be based on the reaction of said diisocyanate—(MPDI/EBDI mixture to IPDI)—ratios in combination with diols and triols, especially with trimethylolpropane (TMP). Prior to the reaction with blocking agents, they have an NCO content of 11–19% by weight, preferably 13–17% by weight and after blocking $\leq 3\%$ by weight, preferably $\leq 2\%$ by weight. The reactants are preferably reacted in such ratios that one NCO group is reacted per OH group.

To carry out the blocking reaction, the isocyanate component is provided and the blocking agent is added in portions. The reaction takes place at temperatures below the decomposition temperature at 90°–130° C. For the isocyanate polyaddition reaction, the catalysts usual in PUR chemistry can also be added in a quantity of 0.001–1% by weight in relation to the total mixture.

Suitable blocking agents are, e.g., phenols, alcohols, acetoacetic esters, lactams, especially ε-caprolactam, as well as triazoles, especially the 1H-1,2,4 triazole that raises the melting point.

The products of the process according to the invention in their use as cross-linking agents for polyurethane powder varnishes are combined with the resins usual for powder varnishes on a polyurethane basis, i.e., preferably with resins containing hydroxyl groups.

Especially suitable as resins containing hydroxyl groups are polyesters, epoxy resins as well as acrylate containing hydroxyl groups with a molecular weight of about 800–10,000, preferably about 1,200–5,000, a hydroxyl number of 20–150 mg KOH/g, preferably 30–100 mg KOH/g and melting points above 60° C., preferably between 70° C. and 100° C.

Preferably suitable for the production of powder varnishes are the polyesters of terephthalic acid with the alcohols hexamethylene glycol, neopentyl glycol.

1,4-dimethanolcyclohexane and 2,2,2-trimethylolpropane.

The usable epoxy resins are listed in the DE-OS 29 45 113, page 12, line 1, to page 13, line 26. Suitable polyacrylates are described in the DE-OS 30 30 539, page 14, line 21, to page 15, line 26.

The resins containing hydroxyl groups are used in such quantities that the OH/NCO ratio is 1:0.8 to 1:1.2, preferably 1:0.95 to 1:1.1. When epoxies are used, an OH/NCO ratio of 1:0.25 to 1:0.75, preferably 1:0.35 to 1:0.55 is recommended.

The usual adjuvants and additives include leveling agents, pigments, dyes, fillers, catalysts, thixotropic agents, ultraviolet and oxidation stabilizers. The quantity of these substances can vary widely in relation to the quantity of the solid binders.

The powdery coating agents are produced, e.g., by mixing the solid resins, polyesters and/or epoxy resin and/or acrylate resin and the blocked polyisocyanates, optionally in combination with the required admixtures, in said quantity ratios and extruded at a higher temperature. This temperature must be higher than the melting point of polyester/epoxy/acrylate or blocked polyisocyanate or below the decomposition temperature of the cross-linking agents.

Cooling down follows extruding; then comes grinding to a particle size smaller than 0.25 mm, preferably <100μ. Thereafter, the larger fractions are removed by sifting and returned to the mill.

The powder ready for spraying to the body to be coated according to known methods is applied, e.g., by electrostatic powder spraying or electrostatic whirl sintering. Subsequently, the varnished objects are baked for 60 minutes to 1 minute in the temperature range of 140°-250° C., preferably 30 to 8 minutes between 160° and 200° C.

For coating with the powdery coating agent, according to the invention, all substrates are suitable that tolerate the cited hardening conditions without loss of the mechanical properties, e.g., metals, glass, ceramic or plastic.

The polyurethane powder varnishes obtained are distinguished from the known ones by better performance in the presence of heat, ultraviolet-ray and chemical influences.

The present invention will be further illustrated by certain examples and references which are provided for purposes of illustration only and are not intended to limit the present invention.

EXPERIMENTAL PART

A. Production of Blocked Varnish Polyisocyanates

Example 1

444 parts by weight of IPDI and 336 parts by weight of MPDI/EBDI mixture (94:6) and 0.15 parts by weight of a catalyst (triethylenediamine/propylene oxide 1:1) were mixed at 80° C. with vigorous stirring. In doing so, heat of reaction occurred immediately, whereby the temperature of the reaction mixture rose to about 95° C. The reaction mixture was heated for about another 30 minutes at this temperature. During this time the NCO content dropped to 30.2% by weight. To remove the monomer diisocyanates that were not reacted, the reaction mixture was distilled in a thin-film evaporator. The reaction product (isocyanatoisocyanurate residue of the thin-film evaporation) had an NCO content of 18.5% by weight; the monomer content was <0.7% by weight.

Blocking 500 parts by weight of isocyanatoisocyanurate with 249.3 parts by weight of ε-caprolactam at 90°-130° C. provided a brittle, grindable adduct with a melting range of 89°-93° C. The free NCO content was <0.8% by weight and the practical latent NCO content was about 12.3% by weight.

Table 1 provides a survey of composition, physical and chemical properties of additional blocked isocyanato-isocyanurates.

| Example | Diisocyanates IPDI | Diisocyanates MPDI/EBDI Mixture | Diisocyanates HDI | NCO Content in % by Weight | *ε-Caprolactam | 1H—1,2,4-Triazole | NCO Content - Latent in % by Weight | Melting Range °C. |
|---|---|---|---|---|---|---|---|---|
| 2 | 532.8 | 268.8 | — | 13.9 | 37.5 | — | 10.1 | 95–99 |
| 3 | 355.2 | 403.2 | — | 15.9 | 42.9 | — | 11.1 | 78–82 |
| 4 | 832.5 | 210 | — | 17.6 | 47.4 | — | 11.9 | 116–118 |
| 5 | 277.5 | 630 | — | 17.1 | 46.1 | — | 11.7 | 72–75 |
| 6 Comparison | 444 | — | 336 | 17.5 | 47.2 | — | 11.9 | 74–79 |
| 7 Comparison | 832.5 | — | 210 | 17.4 | 46.9 | — | 11.8 | 100–102 |
| 8 | 444 | 336 | — | 18.0 | — | 29.6 | 13.9 | 92–97 |
| 9 Comparison | 444 | — | 336 | 17.5 | — | 28.8 | 13.6 | 82–86 |
| 10 Comparison | — | 1000 | — | 19.2 | 51.8 | — | 12.3 | 58–61 |

Remarks:
*ε-caprolactam test portion in terms of 100 parts by weight of isocyanato-isocyanurate. The quantities signify parts by weight. The monomer content following thin-film distillation was <0.7% by weight.

Example 11—Comparison 100 parts by weight of IPDI isocyanurate (IPDI-T 1890 commercial product of the Chem. Werke Huels) with an NCO content of 17.5% by weight and 100 parts by weight of MPDI/EBDI trimer were homogenized at 100°-110° C. The NCO content of the melt amounted to 18.1% by weight. After blocking with the stoichiometric quantity of ε-caprolactam, a solid, well grindable product with a practical latent NCO content of 12.0% by weight and a melting point of 78°-83° C. was obtained.

Example 12—Comparison

In conformity with example 11, equal parts of IPDI-T 1890 and HDI trimer were homogenized and then blocked with ε-caprolactam. The solid product had a latent NCO content of 11.9% by weight and a melting range of 66°-72° C.

Example 13

134 parts by weight of trimethylolpropane were added at 80° C. with vigorous stirring to a mixture consisting of 666 parts by weight of IPDI and 502 parts by weight of an MPDI/EBDI mixture. Following addition, the reaction was heated for another hour at 100° C. and then the nonreacted diisocyanate was removed by thin-film distillation at 160° C./0.1 torr. The process product (residue) had an NCO content of 17.2% by weight; the monomer content was <0.6% by weight.

Blocking with the stoichiometric quantity of ε-caprolactam resulted in a brittle, grindable product with a practical latent NCO content of 11.8% by weight and a melting range of 74°–76° C.

Table 2 provides a survey on composition, chemical and physical properties of additional blocked urethane adducts.

| Example | Diisocyanates | | | NCO Content in % by Weight | *ε-Capro lactam | NCO Content Latent, in % by Weight | Melting Range °C. |
| --- | --- | --- | --- | --- | --- | --- | --- |
| | IPDI | MPDI/EBDI | HDI | | | | |
| 14 | 999 | 252 | — | 16.2 | 43.6 | 11.3 | 98–104 |
| 15 | 333 | 756 | — | 18.2 | 48.9 | 12.2 | 62–68 |
| 16 | 666 | — | 502 | 17.1 | 46.1 | 11.7 | 65–68 |
| Comparison 17 | 999 | — | 252 | 16.0 | 43.1 | 11.2 | 85–93 |
| Comparison | | | | | | | |

*Note:
ε-caprolactam test portion in terms of 100 parts by weight of adduct; the quantities are in parts by weight; the monomer content of the adducts was <0.7% by weight.

Example 18—Comparison

In conformance with example 13, 1,344 parts by weight of MPDI/EBDI mixture and 134 parts by weight of TMP were reacted. The isolated TMP adduct had an NCO content of 17.7% by weight. After blocking with the stoichiometric quantity of ε-caprolactam, a solid product was formed with a latent NCO content of 12% by weight and a melting range of 42°–46° C. The ground cross-linking agent caked after a short time and thus could not be used in powder varnishes.

Example 19—Comparison

The urethane adduct on HDI basis produced in conformance with example 13 was soft and stickly after blocking with ε-caprolactam at room temperature.

Example 20—Comparison

If the individual urethane adducts are homogenized in the melt in conformance with examples 11 and 12, solid products are isolated whose melting points are about 10° C. lower compared with the "true" urethane adducts.

B II. Polyol Components

General Production Directions

The initial components—terephthalic acid (Ts), dimethylterephthalate (DMT), hexamethylene glycol (HD), neopentylglycol (NPG), 1,4-dimethylolcyclohexane (DMC) and trimethylolpropane (TMP) were put into a reactor and heated by means of an oil bath. After the substances had been largely melted, 0.05% by weight of di-n-butyltin oxide was added as a catalyst at a temperature of 160° C. The first methanol separation occurred at a temperature of about 170° C. Within 6–8 hours, the temperature was raised to 220°–230° C. and the reaction was completed within another 12 hours. The polyester was cooled to 200° C. and the volatile parts largely removed within 30–45 minutes by forming a vacuum (1 Hg). During the entire reaction time, the bottom product was stirred and a weak N₂ current was directed through the reactin mixture.

The following table reflects polyester compositions and the corresponding physical and chemical characteristics:

| Examples | 1 | 2 | 3 |
| --- | --- | --- | --- |
| Ts Mol | 9 | 6 | 8 |
| DMT Mol | 9 | 6 | 7 |
| HD Mol | 3 | 4 | 3 |
| NPG Mol | 13 | 5 | 10 |
| DMC Mol | 3 | 3 | 2 |
| TMP Mol | 1 | 1 | 1 |
| OH number mgKOH/g | 50–56 | 48–52 | 32–36 |
| acid number mgKOH/g | 3–4 | 3–4 | 3–4 |
| melting point °C. | ca. 70 | ca. 80 | ca. 85 |
| Second order transition temperature (DTA) °C. | ca. 50 | ca. 55 | ca. 60 |
| Viscosity at 160° C. mPa s | ~10000 | ~15000 | ~40000 |

C. Polyurethane Powder Varnishes

General Production Directions

The ground products, cross-linking agents, polyesters, leveling agents* Masterbatch are thoroughly mixed optionally with the white pigment and optionally fillers in an edge mill and then homogenized in the extruder at 100°–130° C. After cooling, the extrudate is crushed and ground by means of a disk mill to a particle size of <100μ. The powder so produced is applied to degreased, optionally prepared sheet iron with an electrostatic powder sprayer at 60 KV and baked in a circulating dried at temperature between 160° and 200° C.
*Leveling Agent Masterbatch:
10% by weight of the leveling agent—a commercial copolymer of butylacrylate and 2-ethylhexylacrylate—are homogenized in the appropriate polyester in the melt and crushed after solidification.

The abbreviations in the following tables denote:
TL=thickness of layer in μm
HK=hardness according to Koenig in sec (DIN 53 157)
HB=hardness according to Buchholz (DIN 53 153)
ET=Erichsen test in mm (DIN 53 156)
CT=cross-cut test (DIN 53 151)
GG 60° < =measurement of gloss according to Gardner (ASTM-D 523)
Imp. rev.=impact reverse in inch·lb

Example 1

Pigmented Varnish

According to the described process, the powder varnish was produced in accordance with the following formulation, applied and baked between 160° and 200° C.

432.2 parts by weight of polyester according to example B1
171.0 parts by weight of cross-linking agent according to example A1
438.7 parts by weight of white pigment (TiO₂)
54.8 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° ✯ |
| 6/200 | 60–70 | 182 | 111 | 9.6–10 | 0 | 60 | 88 |
| 8/200 | 70 | 184 | 125 | >10 | 0 | >82 | 90 |
| 10/200 | 60–70 | 183 | 125 | >10 | 0 | >82 | 90 |
| 15/180 | 60–70 | 180 | 125 | >10 | 0 | >82 | 86 |
| 20/180 | 65–75 | 179 | 125 | >10 | 0 | >82 | 87 |
| 25/180 | 70 | 179 | 125 | >10 | 0 | >82 | 90 |
| 25/170 | 60–75 | 180 | 111 | 9.2–9.8 | 0 | 50 | 89 |
| 30/170 | 55–70 | 179 | 125 | >10 | 0 | 70 | 90 |
| 35/160 | 70–80 | 181 | 111 | 8.7–9.1 | 0 | 50 | 90 |

Example 2

Pigmented Varnish

According to the described process, the powder varnish was produced in accordance with the following formulation, applied and baked between 160° and 200° C.

493.4 parts by weight of polyester according to example B2
166.6 parts by weight of cross-linking agent according to example A1
480.0 parts by weight of white pigment (TiO₂)
60.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° ✯ |
| 6/200 | 60–75 | 181 | 100 | 9.2–9.9 | 0 | 60 | 88 |
| 8/200 | 70–80 | 184 | 111 | 9.6–10.2 | 0 | >82 | 90 |
| 10/200 | 70 | 182 | 111 | >10 | 0 | >82 | 91 |
| 15/180 | 70 | 180 | 111 | 9.7–10.4 | 0 | >82 | 89 |
| 20/180 | 70–80 | 179 | 125 | >10 | 0 | 70 | 89 |
| 25/180 | 65–80 | 183 | 111 | >10 | 0 | >82 | 88 |
| 25/170 | 75–80 | 182 | 111 | 9.0–9.5 | 0 | 60 | 89 |
| 30/170 | 70 | 179 | 111 | >10 | 0 | 70 | 87 |
| 35/160 | 70–80 | 180 | 111 | 8.1–9.1 | 0 | 50 | 88 |

Example 3

Pigmented Varnish

According to the decribed process, the powder varnish was produced in accordance with the following formulation, applied and baked between 160° and 200° C.

534.6 parts by weight of polyester according to Example B3
125.4 parts by weight of cross-linking agent according to example A1
480.0 parts by weight of white pigment (TiO₂)
60.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° ✯ |
| 6/200 | 80 | 171 | 100 | 8.4–8.7 | 0 | 60 | 68 |
| 8/200 | 70–80 | 170 | 100 | 8.1–8.9 | 0 | 70 | 71 |
| 10/200 | 60–70 | 172 | 111 | 8.8–9.4 | 0 | 60 | 67 |
| 15/180 | 65–80 | 168 | 100 | 7.9–8.1 | 0 | 50 | 70 |
| 20/180 | 70–80 | 171 | 100 | 8.4–8.8 | 0 | 70 | 70 |
| 25/180 | 70–90 | 169 | 100 | 9.2–9.4 | 0 | 70 | 68 |
| 25/170 | 85 | 170 | 100 | 6.7–7.4 | 0 | 60 | 68 |
| 30/170 | 80 | 171 | 111 | 7.5–8.2 | 0 | 60 | 70 |
| 35/160 | 70–85 | 170 | 100 | 5.9–6.2 | 0 | 30 | 71 |

Example 4

Pigmented Varnish

According to the described process, the powder varnish was produced in accordance with the following formulation, applied and baked between 160° and 200° C.

368.8 parts by weight of polyester according to example B1
181.2 parts by weight of cross-linking agent according to example A2
400.0 parts by weight of white pigment (TiO₂)
50.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 80–90 | 190 | 100 | 9.1–9.5 | 0 | 60 | 84 |
| 8/200 | 70–80 | 194 | 100 | 9.9–10.2 | 0 | >82 | 83 |
| 10/200 | 80–90 | 189 | 111 | >10 | 0 | >82 | 86 |
| 15/180 | 75–85 | 186 | 100 | 9.0–9.2 | 0 | 40 | 82 |
| 20/180 | 70–85 | 190 | 100 | 9.7–10.1 | 0 | 70 | 87 |
| 25/180 | 80–90 | 190 | 111 | >10 | 0 | >82 | 83 |
| 25/170 | 70–90 | 188 | 100 | 8.7–9.1 | 0 | 50 | 84 |
| 30/170 | 80–90 | 190 | 100 | 9.4–9.9 | 0 | 70 | 84 |
| 35/160 | 70–80 | 189 | 100 | 8.1–9.0 | 0 | 50 | 86 |

Example 5

Pigmented Varnish

According to the described process, the powder varnish was produced in accordance with the following formulation, applied and baked between 160° and 200° C.

parts by weight of polyester according to example B2
parts by weight of cross-linking agent according to example A2
parts by weight of white pigment (TiO₂)
parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 70–80 | 188 | 100 | 9.3–9.8 | 0 | 60 | 82 |
| 8/200 | 70–85 | 190 | 100 | 9.4–9.9 | 0 | 70 | 80 |
| 10/200 | 60–75 | 187 | 100 | >10 | 0 | >82 | 84 |
| 15/180 | 70 | 189 | 111 | 8.9–9.1 | 0 | 50 | 84 |
| 20/180 | 80–90 | 191 | 100 | 9.2–9.7 | 0 | 70 | 83 |
| 25/180 | 80 | 190 | 111 | 9.9–10.4 | 0 | >82 | 80 |
| 25/170 | 60–85 | 186 | 100 | 8.6–9.0 | 0 | 50 | 82 |
| 30/170 | 70–90 | 188 | 100 | 8.7–9.6 | 0 | 70 | 84 |
| 35/160 | 60–80 | 187 | 100 | 7.8–8.4 | 0 | 40 | 85 |

Example 6

Pigmented Varnish

According to the described process, the powder varnish was produced in accordance with the following formulation, applied and baked between 160° C. and 200° C.

381.2 parts by weight of polyester according to Example B1
168.8 parts by weight of cross-linking agent according to example A3
400.0 parts by weight of white pigment (TiO₂)
50.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 70–80 | 183 | 100 | 9.4–9.7 | 0 | 70 | 86 |
| 8/200 | 70–75 | 186 | 100 | 9.8–10.4 | 0 | >82 | 89 |
| 10/200 | 75–85 | 186 | 100 | >10 | 0 | >82 | 90 |
| 15/180 | 80 | 187 | 100 | 8.9–9.6 | 0 | 50 | 89 |
| 20/180 | 70–80 | 70–80 | 190 | 9.4–10 | 0 | 70 | 87 |
| 25/180 | 65–70 | 187 | 100 | >10 | 0 | >82 | 89 |
| 25/170 | 70–80 | 184 | 100 | 8.5–9.1 | 0 | 40 | 90 |
| 30/170 | 70 | 188 | 100 | 9.0–9.4 | 0 | 70 | 88 |
| 35/160 | 70–85 | 186 | 100 | 8.0–8.4 | 0 | 50 | 89 |

Example 7

Pigmented Varnish

According to the described process, the powder varnish was produced in accordance with the following formulation, applied and baked between 160° C. and 200° C.

389.9 parts by weight of polyester according to Example B1
160.1 parts by weight of cross-linking agent according to example A4
400.0 parts by weight of white pigment (TiO₂)
50.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 70–80 | 177 | 100 | 9.1–9.5 | 0 | >82 | 85 |

-continued

| Baking conditions Time/temperature min/°C. | Mechanical Characteristics | | | | | | |
|---|---|---|---|---|---|---|---|
| | TL | HK | HB | ET | CT | Imp. rev. | GG 60° ⅍ |
| 8/200 | 70–80 | 181 | 111 | 9.3–10 | 0 | 70 | 88 |
| 10/200 | 70 | 180 | 100 | >10 | 0 | >82 | 84 |
| 15/180 | 60–70 | 182 | 100 | 8.9–9.1 | 0 | 60 | 82 |
| 20/180 | 70 | 179 | 100 | 8.9–9.6 | 0 | 70 | 87 |
| 25/180 | 70–80 | 181 | 111 | 9.7–9.9 | 0 | 60 | 83 |
| 25/170 | 80 | 178 | 100 | 7.9–8.1 | 0 | 50 | 85 |
| 30/170 | 60–70 | 180 | 111 | 8.4–8.8 | 0 | 70 | 85 |
| 35/160 | 60–70 | 177 | 100 | 7.2–8.1 | 0 | 40 | 87 |

Example 8

Pigmented Varnish

According to the described process, the powder varnish was produced in accordance with the following formulation, applied and baked between 160° C. and 200° C.

373 parts by weight of polyester according to example B3
100 parts by weight of cross-linking agent according to example A5
344 parts by weight of white pigment (TiO$_2$)
43 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° ⅍ |
| 6/200 | 80–90 | 169 | 100 | 8.0–8.5 | 0 | 60 | 68 |
| 8/200 | 85–95 | 164 | 100 | 8.2–8.9 | 0 | >82 | 70 |
| 10/200 | 70–80 | 170 | 100 | 8.6–93 | 0 | >82 | 71 |
| 15/180 | 70 | 168 | 100 | 9.2–9.6 | 0 | >82 | 66 |
| 20/180 | 60–80 | 170 | 100 | 8.8–9.7 | 0 | >82 | 68 |
| 25/180 | 70 | 172 | 100 | 8.6–9.5 | 0 | >82 | 65 |
| 25/170 | 70–80 | 168 | 100 | 7.3–7.9 | 0 | 60 | 69 |
| 30/170 | 80–90 | 167 | 100 | 8.1–8.8 | 0 | 70 | 70 |
| 35/160 | 90 | 170 | 100 | 6.6–7.5 | 0 | 40 | 70 |

Example 9—Comparison

Pigmented Varnish

According to the described process, the powder varnish was produced in accordance with the following formulation, applied and baked between 160° C. and 200° C.

389.9 parts by weight of polyester according to example B1
160.1 parts by weight of cross-linking agent according to example A6
400.0 parts by weight of white pigment (TiO$_2$)
50.0 parts by weight of leveling agent Masterbatch The ready-to-spray powder has lower storage stability and the coating films result in more yellowing under thermal stress.

| Baking conditions Time/temperature min/°C. | Mechanical Characteristics | | | | | | |
|---|---|---|---|---|---|---|---|
| | TL | HK | HB | ET | CT | Imp. rev. | GG 60° ⅍ |
| 6/200 | 70–80 | 172 | 100 | 8.9–9.3 | 0 | 60 | 84 |
| 8/200 | 70–90 | 174 | 100 | 9.0–9.8 | 0 | >82 | 86 |
| 10/200 | 70 | 176 | 100 | 9.7–10 | 0 | >82 | 83 |
| 15/180 | 70 | 175 | 100 | 8.7–9.3 | 0 | >82 | 82 |
| 20/180 | 70–80 | 177 | 111 | >10 | 0 | >82 | 87 |
| 25/180 | 70 | 177 | 100 | 9.8–10 | 0 | >82 | 84 |
| 25/170 | 60–70 | 174 | 100 | 8.1–8.4 | 0 | 50 | 83 |
| 30/170 | 65–75 | 173 | 111 | 8.6–9.1 | 0 | 70 | 86 |
| 35/160 | 70–80 | 172 | 100 | 8.4–8.9 | 0 | 50 | 85 |

Example 10—Comparison

Pigmented Varnish

According to the described process, the powder varnish was produced in accordance with the following formulation, applied and baked between 160° C. and 200° C.

388 parts by weight of polyester according to example B1
162 parts by weight of cross-linking agent according to example A7
400 parts by weight of white pigment (TiO$_2$)
50 parts by weight of leveling agent Masterbatch In addition to greater thermo-oxidative instability, greater proneness to chalking was noted following treatment with ultraviolet light.

| Baking conditions Time/temperature min/°C. | TL | HK | HB | ET | CT | Imp. rev. | GG 60° ẋ |
|---|---|---|---|---|---|---|---|
| 6/200 | 80 | 172 | 100 | 7.9–8.2 | 0 | 50 | 75 |
| 8/200 | 60–75 | 175 | 100 | 8.0–8.4 | 0 | 70 | 75 |
| 10/200 | 70–80 | 176 | 100 | 8.6–9.1 | 0 | >82 | 76 |
| 15/180 | 70 | 177 | 111 | 7.5–8.3 | 0 | 60 | 77 |
| 20/180 | 75–90 | 173 | 100 | 7.9–8.1 | 0 | 70 | 76 |
| 25/180 | 70 | 170 | 111 | 8.2–8.6 | 0 | 60 | 77 |
| 25/170 | 60–70 | 172 | 100 | 7.0–7.2 | 0 | 40 | 75 |
| 30/170 | 60–70 | 174 | 100 | 7.5–8.1 | 0 | 60 | 77 |
| 35/160 | 70–80 | 170 | 100 | 6.1–6.4 | 0 | 30 | 76 |

Example 11

Pigmented Varnish

According to the described process, the powder varnish was produced in accordance with the following formulation, applied and baked between 160° C. and 200° C.

488.9 parts by weight of polyester according to example B1

171.1 parts by weight of cross-linking agent according to example A8

480.0 parts by weight of white pigment (TiO$_2$)

60.0 parts by weight of leveling agent Masterbatch

| Baking conditions Time/temperature min/°C. | TL | HK | HB | ET | CT | Imp. rev. | GG 60° ẋ |
|---|---|---|---|---|---|---|---|
| 6/200 | 70–80 | 187 | 100 | 9.1–9.6 | 0 | 60 | 88 |
| 8/200 | 60–75 | 186 | 100 | 9.4–10.1 | 0 | >82 | 90 |
| 10/200 | 65–70 | 182 | 100 | >10 | 0 | 70 | 86 |
| 15/180 | 70 | 188 | 111 | 8.8–9.4 | 0 | 70 | 86 |
| 20/180 | 70–80 | 188 | 111 | 9.7 | 0 | >82 | 88 |
| 25/180 | 80 | 186 | 100 | >10 | 0 | >82 | 86 |
| 25/170 | 80 | 185 | 111 | 6.9–7.5 | 0 | 40 | 87 |
| 30/170 | 80–85 | 188 | 100 | 7.8–8.8 | 0 | 60 | 88 |
| 35/160 | 70–85 | 187 | 100 | 6.3–7.5 | 0 | 40 | 85 |

Example 12—Comparison

Pigmented Varnish

According to the described process, the powder varnish was produced in accordance with the following formulation, applied and baked between 160° C. and 200° C.

469.1 parts by weight of polyester according to example B1

190.9 parts by weight of cross-linking agent according to example A11

480.0 parts by weight of white pigment (TiO$_2$)

60.0 parts by weight of leveling agent Masterbatch

| Baking conditions Time/temperature min/°C. | TL | HK | HB | ET | CT | Imp. rev. | GG 60° ẋ |
|---|---|---|---|---|---|---|---|
| 6/200 | 70–80 | 180 | 100 | 9.2–9.9 | 0 | 70 | 86 |
| 8/200 | 80 | 181 | 111 | >10 | 0 | >82 | 89 |
| 10/200 | 60–75 | 184 | 125 | >10 | 0 | >82 | 88 |
| 15/180 | 70 | 180 | 111 | 9.7–10.1 | 0 | >82 | 90 |
| 20/180 | 70 | 180 | 111 | >10 | 0 | >82 | 90 |
| 25/180 | 70–80 | 179 | 111 | >10 | 0 | >82 | 87 |
| 25/170 | 60–70 | 182 | 111 | 9.3–9.9 | 0 | 50 | 88 |
| 30/170 | 70 | 178 | 125 | >10 | 0 | 70 | 86 |
| 35/160 | 75–85 | 181 | 111 | 8.5–8.9 | 0 | 40 | 89 |

Example 13

Pigmented Varnish

According to the described process, the powder varnish was produced in accordance with the following formulation, applied and baked between 160° C. and 200° C.

388 parts by weight of polyester according to example B1

162 parts by weight of cross-linking agent according to example A13

400 parts by weight of white pigment (TiO$_2$)

50.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 60–70 | 172 | 111 | 7.2–7.7 | 0 | 70 | 80 |
| 8/200 | 60 | 170 | 125 | 7.8–8.8 | 0 | >82 | 82 |
| 10/200 | 70–80 | 173 | 111 | 8.7–9.7 | 0 | 70 | 82 |
| 15/180 | 60–701 | 172 | 111 | 6.3–6.9 | 0 | 60 | 80 |
| 20/180 | 60 | 174 | 111 | 7.5–7.9 | 0 | 60 | 78 |
| 25/180 | 70–80 | 174 | 111 | 8.0–8.1 | 0 | 70 | 83 |
| 25/170 | 70 | 174 | 111 | 6.4–6.8 | 0 | 40 | 83 |
| 30/170 | 70–80 | 173 | 111 | 7.4–7.9 | 0 | 70 | 80 |
| 35/160 | 80 | 172 | 100 | 5.9–6.5 | 0 | 30 | 82 |

Example 14—Comparison

Pigmented Varnish

According to the described process, the powder varnish was produced in accordance with the following formulation, applied and baked between 160° C. and 200° C.

465.6 parts by weight of polyester according to example B1

194.4 parts by weight of cross-linking agent according to example A6

480.0 parts by weight of white pigment (TiO$_2$)

60.0 parts by weight of leveling agent Masterbatch

In addition to greater thermo-oxidation instability, greater proneness to chalking was noted also after treatment in ultraviolet light.

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 60–70 | 168 | 100 | 7.5–8.2 | 0 | 70 | 69 |
| 8/200 | 60–70 | 170 | 100 | 7.9–8.4 | 0 | >82 | 66 |
| 10/200 | 60–65 | 169 | 100 | 8.7–96 | 0 | >82 | 70 |
| 15/180 | 70 | 172 | 111 | 5.9–6.0 | 0 | 40 | 68 |
| 20/180 | 70–75 | 169 | 111 | 6.0–6.5 | 0 | 50 | 68 |
| 25/180 | 70–80 | 170 | 111 | 7.1–7.7 | 0 | 70 | 70 |
| 25/170 | 70–80 | 168 | 100 | 5.0–5.3 | 0 | 20 | 69 |
| 30/170 | 80 | 172 | 111 | 6.4–6.9 | 0 | 50 | 67 |
| 35/160 | 70–80 | 170 | 100 | 4.7–5.1 | 0 | 10 | 70 |

Example 15—Comparison

Pigmented Varnish

According to the described process, the powder varnish was produced in accordance with the following formulation, applied and baked between 160° C. and 200° C.

428.9 parts by weight of polyester according to example B1

176.1 parts by weight of cross-linking agent according to example A20

440.0 parts by weight of white pigment (TiO$_2$)

55.0 parts by weight of leveling agent Masterbatch

| Baking conditions Time/temperature min/°C. | Mechanical Characteristics | | | | | | |
|---|---|---|---|---|---|---|---|
| | TL | HK | HB | ET | CT | Imp. rev. | GG 60° |
| 6/200 | 80–90 | 176 | 100 | 7.5–7.7 | 0 | 50 | 77 |
| 8/200 | 80 | 178 | 100 | 8.0 | 0 | 60 | 77 |
| 10/200 | 85–90 | 177 | 100 | 8.2–8.4 | 0 | >82 | 75 |
| 15/180 | 90–100 | 180 | 100 | 5.7–7.7 | 0 | 40 | 76 |
| 20/180 | 80–90 | 177 | 100 | 6.9–7.4 | 0 | 40 | 78 |
| 25/180 | 80–95 | 178 | 111 | 8.0–8.4 | 0 | 70 | 74 |
| 25/170 | 90–100 | 178 | 100 | 6.2–6.7 | 0 | 30 | 75 |
| 30/170 | 90 | 180 | 100 | 7.1–7.7 | 0 | 50 | 75 |
| 35/160 | 80–95 | 179 | 100 | 5.7–6.4 | 0 | 20 | 77 |

D Epoxy Resin Powder Varnish

D 1. Epoxy Resins Used for the Production of Powder Varnishes

Two epoxy resins based on an adduct made of 2,2-bis(4-hydroxylphenyl)propane (Dian) and epichlorohydrin were used, which were first subjected to HCl separation and then reacted with additional Dian.

According to information from the manufacturer, the epoxy resins had the following physical data:

| | |
|---|---|
| D 1.1 EP equivalent weight | 90–1000 |
| EP value | 0.10–0.11 |
| OH value | 0.34 |
| Melting range | 96–104° C. |
| D 1.2 EP equivalent weight | 1700–2000 |
| EP value | 0.05–0.059 |
| OH value | 0.36 |
| Melting range | 125–132° C. |

Example D 1.3

Pigmented Varnish

According to the process described in example C, the powder varnish with the following recipe was produced, applied and baked between 180°–200° C.

87.9 parts by weight of epoxy according to example D 1.1

110.4 parts by weight of epoxy according to example D 1.2

126.7 parts by weight of cross-linking agent according to A1

150.0 parts by weight of white pigment ($TiO_2$) 25.0 parts by weight of leveling agent Masterbatch (10% Modaflow in epoxy according to D 1.1)

| Baking conditions Time/temperature min/°C. | Mechanical Characteristics | | | | | | |
|---|---|---|---|---|---|---|---|
| | TL | HK | HB | ET | CT | Imp. rev. | GG 60° ⅍ |
| 15/200 | 60–70 | 193 | 111 | 5.7–7.0 | 0 | 40 | 84 |
| 20/200 | 70 | 195 | 111 | 6.4–8.0 | 0 | 60 | 86 |
| 25/180 | 70–80 | 190 | 111 | 5.2–6.8 | 0 | 30 | 85 |
| 30/180 | 65–80 | 197 | 111 | 6.7–7.1 | 0 | 50 | 85 |

Example D 1.4

Pigmented Varnish

According to the process described in example C, the powder varnish with the following recipe was produced, applied and baked between 180° C.–200° C.

108.4 parts by weight of epoxy according to example D 1.2

85.9 parts by weight of epoxy according to example D 1.1

130.7 parts by weight of cross-linking agent according to A13

150.0 parts by weight of white pigment ($TiO_2$)

25.0 parts by weight of leveling agent Masterbatch (10% Modaflow in epoxy according to D 1.1)

| Baking conditions Time/temperature min/°C. | Mechanical Characteristics | | | | | | |
|---|---|---|---|---|---|---|---|
| | TL | HK | HB | ET | CT | Imp. rev. | GG 60° ⅍ |
| 15/200 | 60 | 192 | 111 | 5.8–6.0 | 0 | 30 | 83 |
| 20/200 | 60–75 | 187 | 111 | 6.1–7.8 | 0 | 70 | 83 |
| 25/180 | 70–80 | 193 | 111 | 5.5–6.5 | 0 | 20 | 85 |
| 30/180 | 65–75 | 190 | 111 | 6.2–7.1 | 0 | 50 | 84 |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A mixture of substances suitable as a powder varnish or a binder for powder varnishes consisting essentially of an isocyanate component with partially or totally blocked isocyanate groups, and a polyhydroxyl component, wherein mixed trimers or mixtures of individual trimers are used as the isocyanate component from a mixture consisting essentially of 2-methyl-1,5-diisocyanatopentane (MPDI) and 2-ethyl-1,4-diisocyanatobutane (EBDI) having the formulas:

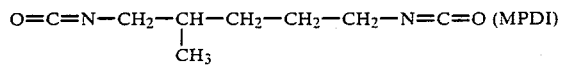

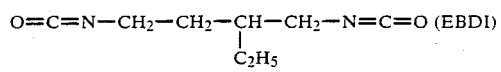

in the amounts of about 88 to 99% by weight of (MPDI) and about 12 to 1% by weight of (EBDI), in combination with 3-isocyanato-3,5,5-trimethyl-cyclohexylisocyanate (IPDI) or mixed urethane adducts or a mixture of individual urethane adducts obtained from the reaction of the MPDI/EBDI mixture in combination with IPDI with diols or triols or a mixture thereof.

2. The mixture of substances suitable as a powder varnish or as a binder for powder varnishes as in claim 1, wherein the ratio of the diisocyanate mixture MPDI/EBDI to IPDI, used for trimerization or urethane adduct formation, is between about 90 and 10% by weight and 10 and 90% by weight, respectively.

3. The mixture of substances suitable as a powder varnish or as a binder for powder varnishes as in claim 2, wherein said ratio is between about 75 and 25% by weight and 25 and 75% by weight, respectively.

4. The mixture of substances suitable as a powder varnish or as a binder for powder varnishes as in claim 1, wherein said blocked isocyanate component has a latent NCO content of about 7–18% by weight and a free NCO content of less than or equal to 3% by weight.

5. The mixture of substances suitable as a powder varnish or as a binder for powder varnishes as in claim 4, wherein said blocked isocyanate component has a latent NCO content of about 9–15% by weight and a free NCO content of less than or equal to 2% by weight.

6. The mixture of substances suitable as a powder varnish or as a binder for powder varnishes as in claim 1, wherein said trimer is an isocyanurate trimer having a NCO content of about 14–22% by weight and said urethane adduct has a NCO content of about 11–19% by weight.

7. The mixture of substances suitable as a powder varnish or as a binder for powder varnishes as in claim 6, wherein said isocyanurate trimer has a NCO content of 15.0–20.5% by weight and the urethane adduct has a NCO content of 13–17% by weight.

8. The mixture of substances suitable as a powder varnish or as a binder for powder varnishes as in claim 1, wherein said trimers have about 30–50% of the NCO groups reacted.

9. The mixture of substances suitable as a powder varnish or as a binder for powder varnishes as in claim 1, wherein said diol or triol is trimethylolpropane.

10. The mixture of substances suitable as a powder varnish or as a binder for powder varnishes as in claim 1, wherein said polyhydroxyl component is selected from the group consisting of polyesters, epoxy resins and acrylates containing hydroxyl groups, having a molecular weight of about 800–10,000.

11. The mixture of substances suitable as a powder varnish or a binder for powder varnishes as in claim 1, wherein said polyesters are the polyesters of terephthalic acid with the alcohols hexamethylene glycol, neopentyl glycol, 1,4-dimethanolcyclohexane and 2,2,2-trimethylolpropane.

12. The mixture of substances suitable as a powder varnish or as a binder for powder varnishes as in claim 1, wherein said isocyanate component is blocked by ε-caprolactam and 1H-1,2,4-triazole.

* * * * *